INVENTORS
CHARLES H. McALPINE
KENNETH G. McGOWAN
BY
Woodhams, Blanchard & Flynn
ATTORNEYS June 8, 1965     C. H. McALPINE ETAL     3,187,649
VERTICALLY YIELDING RECEIVING TABLE AND CONTROL MEANS FOR SAME
Filed March 7, 1963     5 Sheets-Sheet 4

INVENTORS
CHARLES H. McALPINE
KENNETH G. McGOWAN
BY
ATTORNEYS

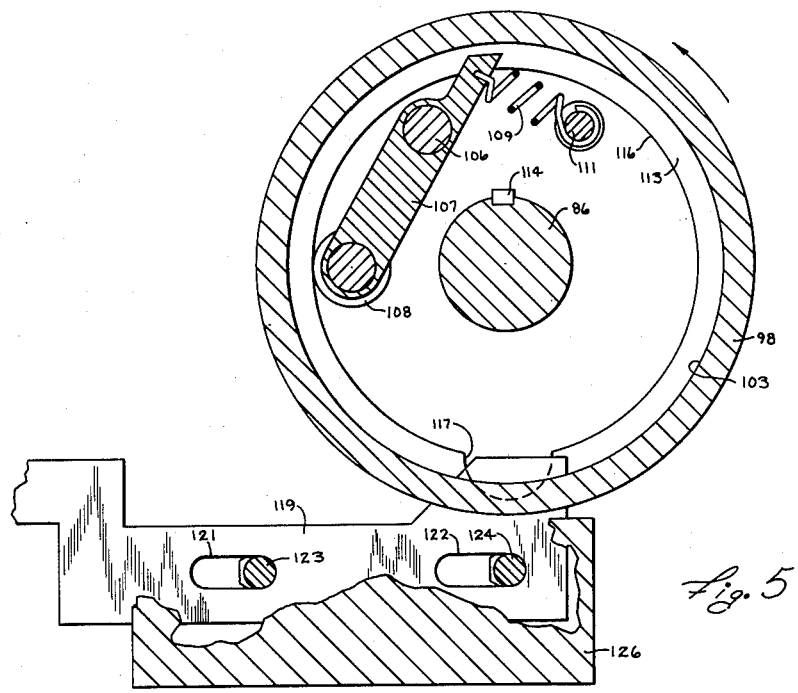
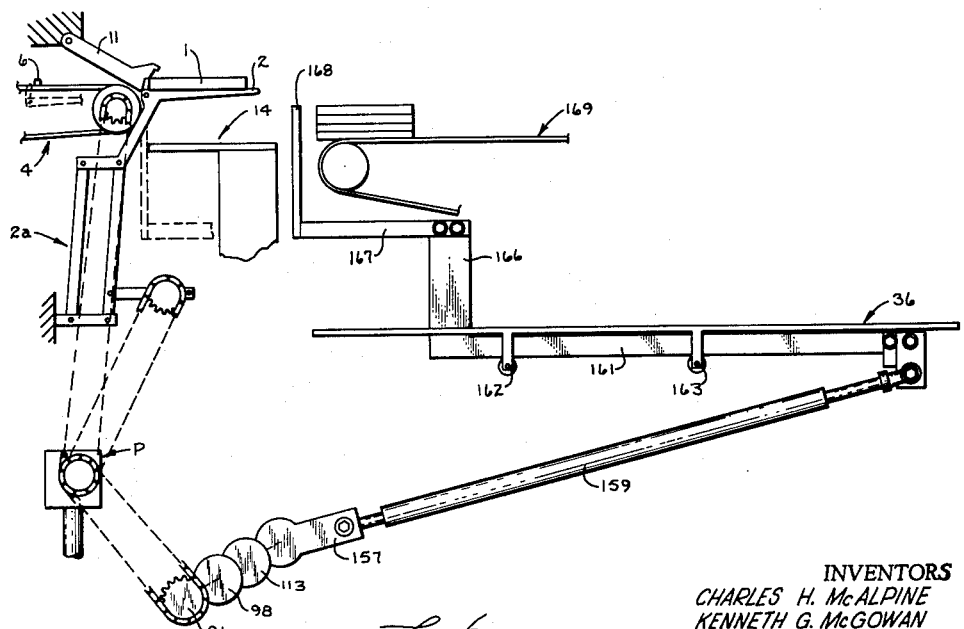
INVENTORS
CHARLES H. McALPINE
KENNETH G. McGOWAN
BY Woodhams, Blanchard & Flynn
ATTORNEYS

United States Patent Office 3,187,649
Patented June 8, 1965

3,187,649
VERTICALLY YIELDING RECEIVING TABLE AND CONTROL MEANS FOR SAME
Charles H. McAlpine, Coloma Township, Berrien County, and Kenneth G. McGowan, Lawrence Township, Van Buren County, Mich., assignors to Winkel Machine Company, Inc., Watervliet, Mich., a corporation of Michigan
Filed Mar. 7, 1963, Ser. No. 263,495
15 Claims. (Cl. 93—93)

This invention relates to stack-forming means and it relates particularly to platform means for receiving panels or groups of panels from a feeding device wherein said platform will be lowered as said stack is formed thereon and when said stack is of a predetermined height, a signal is given and means are actuated for performing a desired further operation, such as moving the stack off the platform.

While the subject matter of the invention is of much broader applicability than the requirements of the battery-making industry, it will be understood that the problems giving rise to the present invention occurred in connection with machines for making storage batteries and accordingly the embodiment hereinafter utilized for illustrating the invention has been built for the specific purpose of receiving and handling storage battery components. Accordingly, the same will be utilized for illustrating the invention, and free reference to the storage battery manufacturing industry will be made in connection therewith but it will be recognized that such reference to the manufacture of storage batteries is for convenience in illustrating the invention and has no limiting significance.

In the manufacture of storage batteries it is customary to form individual cell groups, namely, a group of components consisting of one positive and one negative plate together with appropriate separators therebetween, on suitable means such as a continuously or intermittently moving conveyor belt and delivering said cell units to appropriate receiving means at the end of said conveyor belt. Such means for forming said cell units are well known in the industry and may, for example, be illustrated by U.S. patents to Herbert C. Winkel, No. 2,870,921 and No. 2,908,377. In each of these devices, however, the conveyor discharges at a substantially constant height and hence as the stack forms its base is preferably lowered whereby the conveyor can continue to discharge at a constant horizontal position onto the top of said stack. When a stack reaches a sufficient height, it is desirable to actuate means by which said stack is pushed off from its forming position onto other means, such as a conveyor for carrying same to a point for further handling. Machines for this purpose and operating generally in the manner as thus far described have been known for several years.

However, previously known machines have been, insofar as I am aware, unreasonably complicated and therefore they have been either unacceptably expensive to manufacture, and maintain in good operating condition or sometimes unreliable. Therefore, in a continuing effort to produce improved apparatus of this general type, and in recognition of the persisting difficulties in the use of previously known machines of this general type, the invention as set forth hereinafter has been created.

The objects of the invention are as follows:

(1) To provide a machine for stacking a plurality of articles, such as storage battery components, having a platform for receiving said components from a source at a constant vertical height wherein said platform is progressively lowered as a stack is formed thereon in order to receive further components at a constant level throughout the period of increasing height of said stack.

(2) To provide apparatus, as aforesaid, which will be much simpler than previously known devices for this purpose and accordingly will be less expensive to manufacture and less expensive to maintain in good operating condition.

(3) To provide apparatus, as aforesaid, which will be composed of simple and positive operating parts whereby the resulting mechanism will operate more accurately and precisely than previously known apparatus for this purpose.

(4) To provide apparatus, as aforesaid, in which it will be easy to select the position of the platform at which a subsequent means is operated for further processing of said stack, such as for moving same off said platform.

(5) To provide apparatus, as aforesaid, which will have a high degree of flexibility and hence be readily operable with a wide variety of particular panel-form products, both where said panels are applied to said platform singly and when, as in the battery-making industry, they are applied in groups.

(6) To provide apparatus, as aforesaid, which can be readily fastened to the discharge end of preliminary stack-forming devices such as illustrated in the above-mentioned United States patents.

Other objects and purposes of the invention will be apparent to persons acquainted with devices of this general type upon reading the following disclosure and inspecting the accompanying drawings.

In the drawings:

FIGURE 5 is a sectional view taken on the line V—V of FIGURE 4.

FIGURE 6 is a sectional view taken on the line VI—VI of FIGURE 4.

FIGURE 7 is a fragmentary, oblique view of part of the apparatus shown in FIGURE 2.

*General Description*

Generally, the invention provides a vertically yielding table or platform upon which are received one at a time, from external substackforming and delivering means, substacks of planar articles, each said substack consisting of one or more planar articles assembled in a vertically disposed relationship. Upon reception of one of said substacks thereon from the external means, which may include a conveyor, the table is lowered vertically a distance corresponding to the thickness of said substack. A continuously rotating crank cam, operating in synchonization with the substack-forming and delivering means, acts upon a crank connected to a pawl and rack device to lower said table as above described. Means, controlled by the movement of said table, are provided whereby the number of said planar articles in selected ones of said substacks may be changed in the aforementioned external means. Signal means are provided, actuated by the position of said table, whereby after a preselected number of said substacks have been deposited on said table, ejector means are actuated to remove the stack of articles from said table and whereby said table is returned to its original or starting position. Said ejection nad table return may be accomplished in the normal time interval between substack arrivals at the table location.

*Detailed description*

Figure 1:
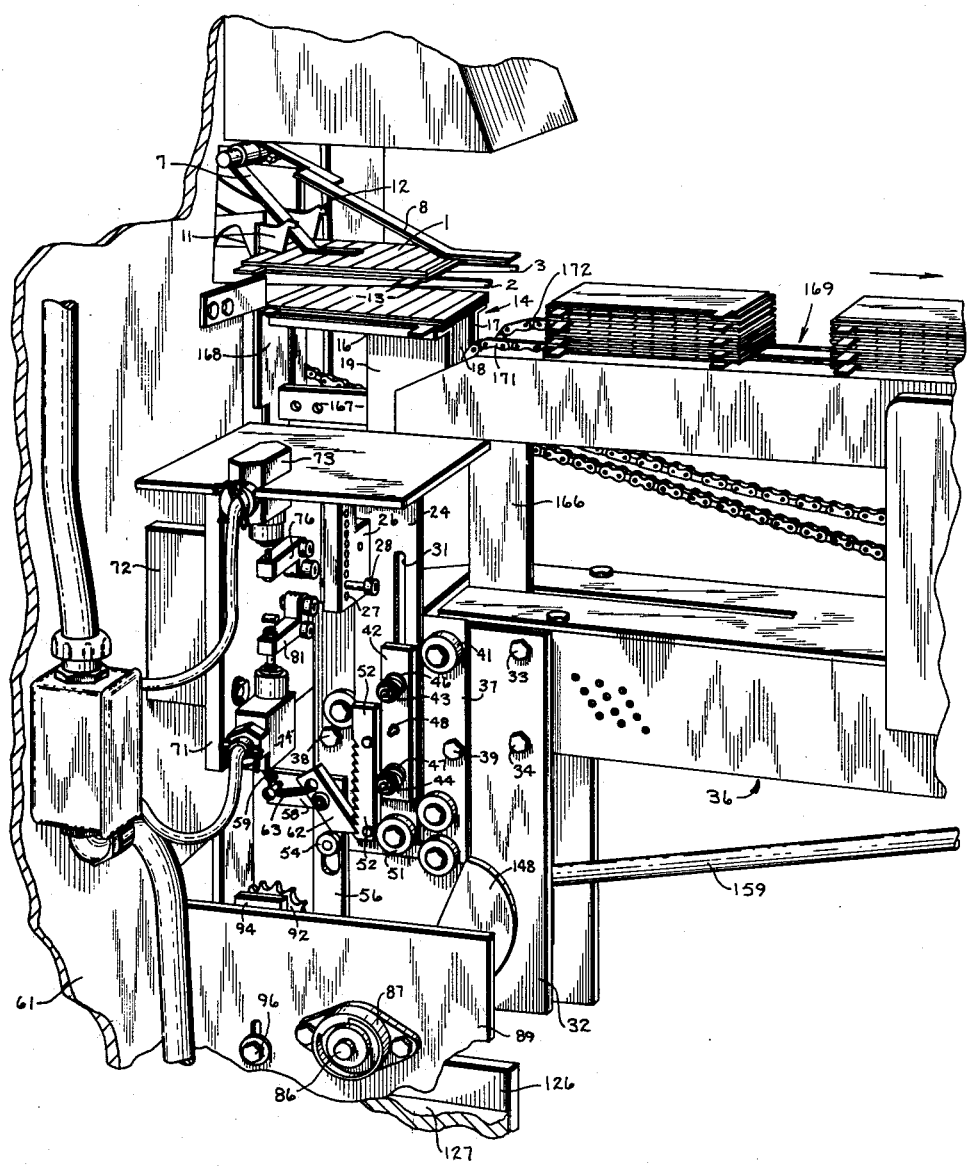
FIGURE 1 is a perspective view of an apparatus embodying the invention.
Figure 2:
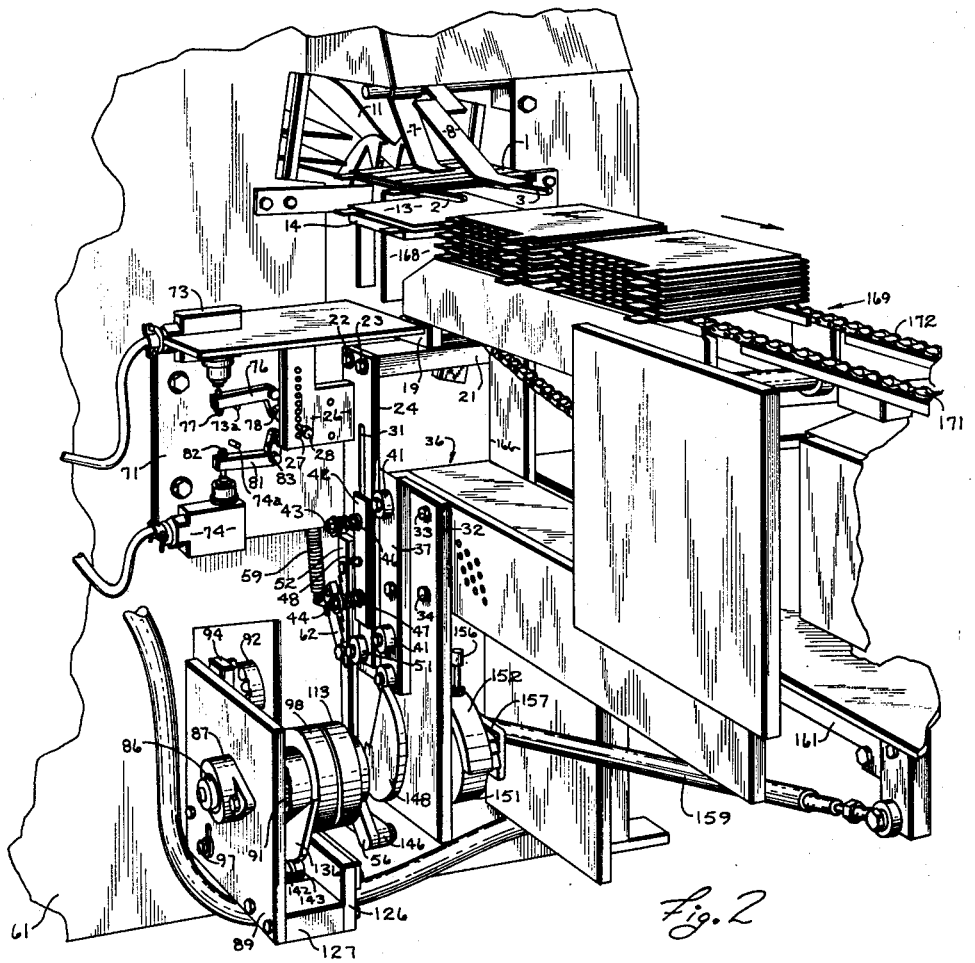
FIGURE 2 is a perspective view of an apparatus embodying the invention.

For purposes of convenience in reference, the terms "frontwardly" and "rearwardly" and derivatives thereof, will refer to the direction of substack flow through the apparatus as shown in FIGURES 1 and 2, unless otherwise specified the direction of said flow being defined as from rear to front. The terms "downwardly," "upwardly," "rightwardly" and "leftwardly" and derivatives thereof will freely be used to indicate directions taken with respect to the drawings. Such terminology will be used solely with respect to the drawings and will have no other or limiting significance.

Turning now to the drawings and more specifically to FIGURES 1 and 2, a substack 1 of planar articles which may be, and will hereinafter for purposes of illustration only be referred to as, battery plates are here shown as being moved rightwardly onto a table or platform 14 by an input conveyor 4 (FIGURE 6) which may be of any convenient type but which is here shown for purposes of illustration to be a chain conveyor having a plurality of spaced lugs 6 thereon. The conveyor 4 is preferably continuously and positively driven by any convenient means such as the power source indicated at P.

Intermediate means may be employed if desired to assist the depositing of substacks on the table 14 by the conveyor 4. An example of such means is generally shown in FIGURES 1, 2 and 6, and includes a pair of generally horizontal, parallel, spaced fingers 2 and 3 which are retractable by any convenient means driven in synchronism with the conveyor 4 here shown for purposes of illustration only as the eccentric driven, parallelogram support 2a (FIGURE 6). The fingers 2 and 3 may be employed to receive a substack 1 from the conveyor and, upon retracting from their forwardmost position shown, deposit said substack on the table 14. The intermediate means may also include means such as the flat springs 7 and 8 (FIGURES 1 and 2) which are mounted above and between the fingers 2 and 3 and which act in cooperation with keeper members 11 and 12 to assist in maintaining the substack 1 in the correct position with respect to the table 14 as the fingers 2 and 3 extend to and retract from their forwardmost position.

The table 14 consists of a pair of spaced, preferably parallel, L-shaped members 16 and 17 having approximately horizontal, coplanar upper faces and vertically depending legs 18 and 19, respectively. The legs 18 and 19 are joined at their lower ends by a generally horizontal table support plate 21 (FIGURE 2) which is in turn at its leftward end secured by any convenient means such as screws 22 and 23 to a vertically depending slider plate 24. Said slider plate has preferably at its upper end a tripper block 26 secured thereto and having a plurality of vertically aligned, spaced tripper pin holes 27 therein for holding in one thereof a tripper pin 28 for purposes appearing hereinafter.

A fixed switch plate 71 (FIGURES 1, 2 and 3) is secured by any convenient means such as the spacer 72 to a fixed frame structure 61 and is preferably perpendicular to the tripper pin 28. A plate switch 73 (FIGURE 4) is mounted on the front face of the switch plate 71 near the top thereof and a clutch switch 74 is mounted near the lower end thereof. A generally L-shaped actuating lever 76 is pivotally mounted at or near its apex on the switch plate 71 and has a leftwardly extending, generally horizontal leg terminated by an adjusting screw 77 which bears on the activating mechanism for the plate switch 73. The activating lever 76 has a downwardly angled leg terminating in a roller 78 lying in the path of the tripper pin 28 whereby movement of said tripper pin past said roller will activate the plate switch 73. A similar generally L-shaped lever 81 is pivotally mounted at or near its apex on the switch plate 71 and has a generally horizontal, leftwardly extending leg terminated by an adjustment screw 82 which bears on the activating mechanism for the clutch switch 74. The lever 81 has an upwardly angled leg terminating in a roller 83 which lies in the path of the tripper pin 28 whereby movement of the tripper pin 28 past the roller 83 will activate the clutch switch 74. Limit pins 73a and 74a are fixed to the plate 71 so as to limit the movement of the levers 76 and 81, respectively, away from their respective switches.

Figure 3:
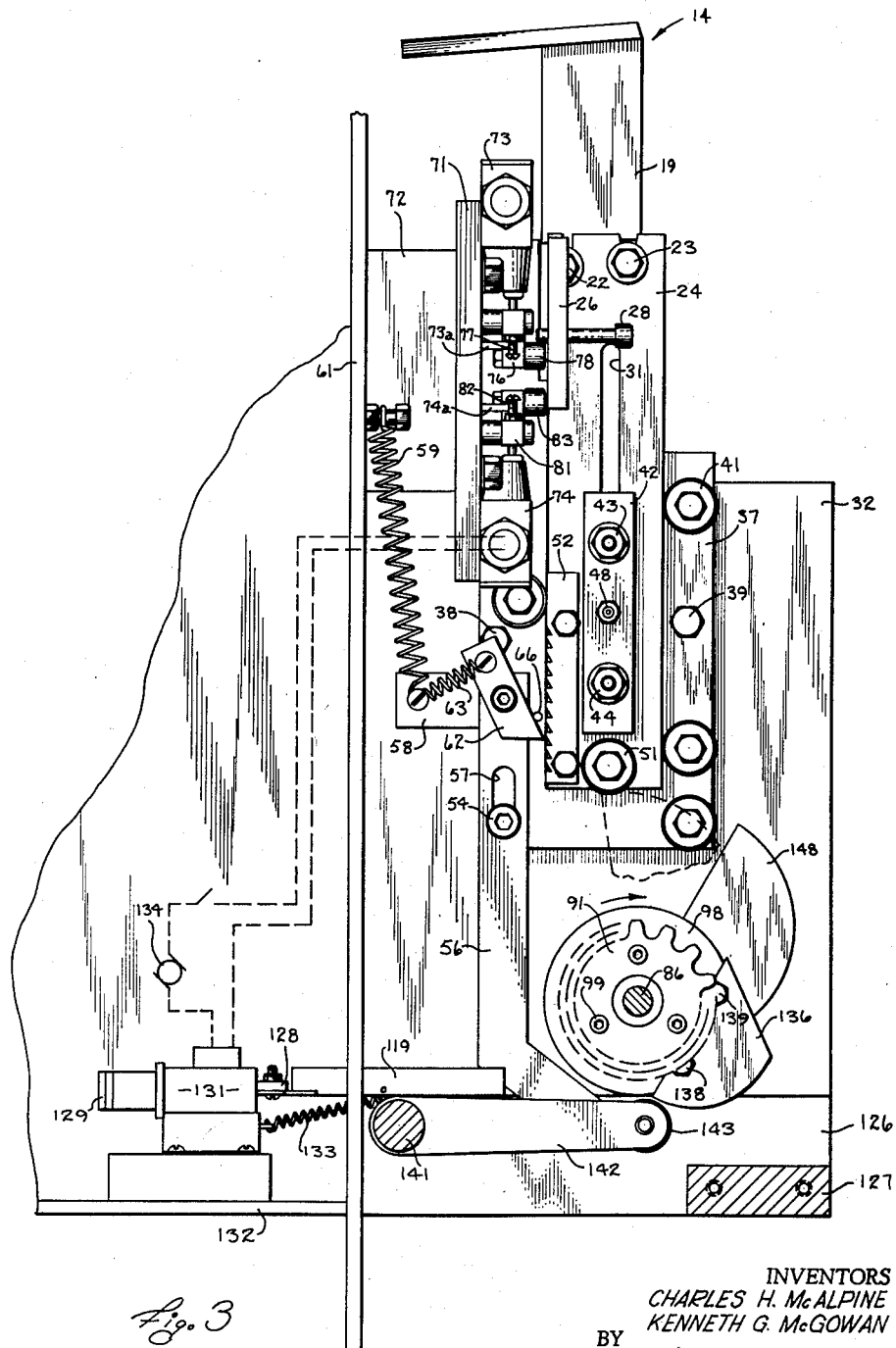
FIGURE 3 is a sectional view taken on the line III—III of FIGURE 4.

A fixed plate 32 (FIGURES 1 and 2) is secured by any convenient means such as screws 33 and 34 to fixed supporting framework generally indicated at 36. The fixed plate 32 is preferably vertical and parallel with the direction of substack flow through the apparatus and has secured thereto a fixed slide base 37 by any convenient means such as screws indicated at 38 and 39 (FIGURE 3). Plate 24 lies against said slide base 37 and between a plurality of guide rollers 41 for vertical movement with respect thereto. A spring-loaded, fixed retainer plate 42 has a pair of studs 43 and 44 (FIGURES 1–4) passing through holes therein, said studs also passing through a vertical slot 31 in the slider plate 24 and being secured to the slide base 37. The studs 43 and 44 are terminated at their free ends by springs 46 and 47, respectively, which urge the retainer plate 42 toward the slide base 37 so as to exert a compression force on slider plate 24 whereby to frictionally restrain the vertical movement thereof. Lubrication means, of any convenient type, here shown as a Zirk fitting 48, is provided to lubricate the slider plate 24 so as to avoid frictional damage thereto.

The slider plate has rotatably secured to its lower end a cam roller 51 as well as a vertically disposed rack 52 for purposes appearing hereinafter.

Figure 4:
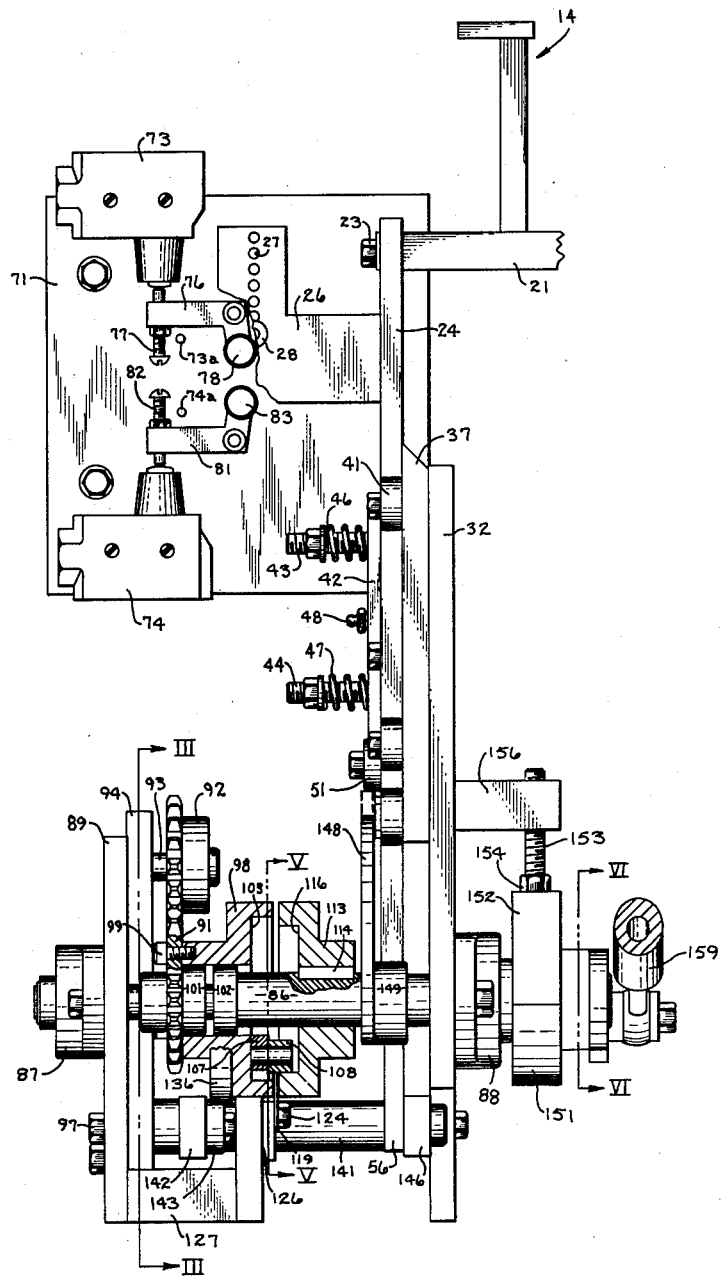
FIGURE 4 is a partially broken front view of part of the apparatus shown in FIGURE 2.

Turning now to the FIGURES 3 and 4, the slider base 37 pivotally and slidingly supports at its lower left-hand corner (FIGURE 3) by means of a screw 54, a vertically disposed, approximately L-shaped, pawl carrier 56 having a slot 57 therein for engaging the screw 54. An extension plate 58 is secured to and extends leftwardly from the upper end of the pawl carrier 56. A lift spring 59 is secured at its lower end to the leftward end of said extension 58 and at its upper end to the fixed frame structure 61 whereby the pawl carrier 56 is biased toward its upwardmost position as permitted by the slot 57 and the screw 54. A center pivoted pawl 62 is pivotally mounted on the upper end of the pawl carrier 56 and a pawl spring 63 is disposed between the upper end of said pawl and the leftward end of the extension plate 58 for biasing said pawl in a counterclockwise direction. A disengage pin 66 is secured to the slide base 37 between the rack 52 and the pawl 62 whereby when the pawl carrier 56 is in its vertically uppermost position said disengage pin 66 prevents engagement of the rack 52 by the pawl 62 and whereby when the pawl carrier 56 is in its lowermost position, said pawl 62 is allowed to engage the rack 52 in order that the rack 52, the slider plate 24 and table 14 attached thereto are urged downwardly by downward movement of the pawl carrier 56. Means for effecting the downward movement of the pawl carrier 56 will be discussed hereinafter.

A main shaft 86 (FIGURES 2 and 4) is preferably axially perpendicular to the plane of the slider plate 24 and is held for rotation in bearings 87 and 88 which are secured to a fixed endplate 89 and to the fixed plate 32, respectively. The fixed end plate 89 is secured to the frame structure 61 by any convenient means such as by welding. Immediately to the right (FIGURE 4) of the end plate 89, the main shaft 86 supports for rotation thereon driven means of any convenient positive type here shown for purposes of illustration as a driven chain sprocket 91 preferably continuously and positively driven from the same power source P (FIGURE 6) as is the conveyor 4, whereby a desired synchronism in the speeds of the conveyor 4 and driven sprocket 91 may be effected and maintained. Drive-tensioning means such as an idler sprocket 92 (FIGURE 4) may be employed and said idler sprocket is here shown as being mounted for rotation on a stub shaft 93 which is in turn fixed to an idler adjustment plate 94. The idler adjustment plate 94 is secured to the fixed end plate 89 and is vertically adjustable thereon by means of the screws 96 (FIGURE 1) and 97 (FIGURE 4) for properly tensioning the means driving the sprocket 91. The driven sprocket 91 has fixed to its rightward face, by means such as the screws 99, an essentially cylindrical clutch driver half 98. The clutch driver half 98 is supported on the main shaft 86 by means of bearings 101 and 102. The clutch driver half 98 has secured to its leftward radial surface (FIGURE 4) a crank cam 136 (FIGURES 3 and 4) by means such as the screws 138 and 139. A crank shaft 141, preferably lying parallel to and somewhat behind and below the main shaft 86, is pivotally supported by any convenient means not shown on the plates 89 and 32. Said crankshaft has fixed to it a crank 142 extending essentially forwardly therefrom and terminated with a roller 143 mounted for rotation thereon, said roller being in alignment with the crank cam 136 as shown in FIGURE 4. Toward the rightward end of the crank shaft 141, as seen in FIGURE 4, there is mounted, by any convenient means not shown, an arm 146 which is preferably parallel to the crank 142 and the radially outer end of which is secured for pivotal movement to the lower end of the pawl carrier 56. Thus, rotation of the clutch driver half 98 and the crank cam 136 attached thereto will effect, when the clutch cam 136 moves into contact with the roller 143, angular movement of the crank 142 and crank shaft 141. This will cause angular movement of the arm 146 whereby the pawl carrier 56 is moved downwardly to effect downward movement of the table 14.

In the particular embodiment disclosed in FIGURES 3 and 4 it will be noted that the crank cam 136 will bear upon the roller 143 for approximately 90 degrees of the rotation of the clutch driver half 98. It will be noted that this angle is used only for purposes of illustration and is not limiting. The radial movement of the crank 142 and arm 146 produced thereby is preferably relatively small whereby the arm 146 lies at all times within a range of nearly horizontal position whereby the movement of the pawl carrier 56 is primarily vertical in direction. It will further be noted that the amount of angular movement of the arm 146 is sufficient to cause the pawl carrier 56 and pawl 62 attached thereto to move the rack 52 and thus the table 14 downwardly a distance corresponding to one notch in the rack 52 for each rotation of the crank cam 136. The spacing of the notches on the rack 52 may as is here shown for purposes of illustration, be approximately equal to the thickness of the substacks to be placed on the table 14, whereby the effective top of the stack of substacks on the table 14 will remain at approximately the same height while said stack is being made up.

The rightward end of the clutch driver half 98 is radially enlarged and the rightward radial face thereof has a concentric recess 103 therein. The radial face of the recess 103 has fixed thereto a post 106 (FIGURE 5) which pivotally supports a lever 107, upon one end of which is fixed for rotation a roller 108 which extends (FIGURE 4) rightwardly past the rightward radial face of the clutch driver half 98. The other end of the lever 107 is attached to one end of a spring 109 the other end of which is attached to a pin 111 fixed to the inner radial surface of the recess 103, whereby the roller 108 is urged radially outwardly from the main shaft 86.

A generally cylindrical clutch driven half 113 is concentric with and fixed to the main shaft 86 by means such as the key 114, whereby the clutch driven half 113 is to the right of and spaced from the clutch driver half 98. The clutch driven half 113 has in its leftward radial face a cylindrical recess 116 concentric therewith and of slightly smaller radius than the recess 103. The radially outer wall of the recess 116 has a generally hemicylindrical inset 117 cut therein, of radius equal to or slightly greater than the radius of the roller 108, whereby the driver clutch half 98 will drive the driven clutch half 113 when the roller 108 becomes adjacent to the inset 117 and is forced thereinto by the spring 109. Rotation of the clutch driver half 98 in a counterclockwise direction as seen in FIGURE 5 will, when the roller 108 is located in the inset 117, produce a clockwise torque on lever 107 further urging the roller 108 into the inset 117, whereby the clutch driver half 98 will positively drive the clutch driven half 113 regardless of the load presented by the main shaft 86.

Referring to FIGURES 4 and 5, the clutch driven half 113 is disengageable from the clutch driver half 98 by means of a cam plate 119 which is fixed for preferably horizontal, sliding movement tangential to the radially outerwall of the recess 116 and between the clutch halves 98 and 113. Sliding movement of the cam plate 119 is assured by any convenient means such as the horizontal slots 121 and 122 therein which enable said cam plate to slide on screws 123 and 124 secured to a fixed support 126 which is fixed by means of the block 127 to the fixed end plate 89. The cam plate 119 (FIGURE 3) extends leftwardly or to the rear of the main shaft 86, through the frame structure 61 and is connected to an extension 128 of the rod 129 of a solenoid 131, said solenoid being fixed by any convenient means to a fixed member 132 which is in turn connected to the support structure 61. The solenoid rod 129 is biased rearwardly or away from the main shaft 86 by means such as a spring 133. The coil of the solenoid 131 is connected in series with a source of potential of any convenient type and generally indicated at 134 and the clutch switch 74, whereby when the clutch switch 74 is open, the solenoid 131 will be de-energized and the spring 133 will retract the cam plate 119 rearwardly whereby the recess 117 will be blocked and the clutch driver half 98 will not be permitted to engage the clutch driven half 113. When the clutch switch 74 is activated by the tripper pin 28 and is thereby closed, the solenoid 131 will be energized whereby to extend the cam plate 119 and engage the clutch.

FIGURE 4 discloses a lift cam 148 fixed to the main shaft 86 by any convenient means such as a collar 149 and spaced to the right of the clutch driven half 113 whereby said cam is in alignment with the roller 51 on the slider plate 24 and wherein movement of said cam is not restricted by the rollers 41 on the slider base 37. In the particular embodiment shown in FIGURE 3, the lift cam 148 is of approximately hemicircular shape and is designed to provide lift for about 90 degrees rotation of the main shaft 86. The lift cam 148, upon rotation of the main shaft 86 through a preselectable arc, will bear against the roller 51 whereby to lift the slider plate 24 and table 14 attached thereto from a lower position to its uppermost or starting position. Said preselectable arc may be changed by varying the angular position of the lift cam 148 on the main shaft 86. It will be recognized that the particular amount of rotation through which the lift cam 148 bears on the roller 51 as well as the particular shape thereof disclosed hereinabove is given for purposes of illustration only and is not to be taken as limiting.

A cylindrical brake drum 151 is fixed by any convenient means not shown to the main shaft 86 to the right of the bearing 88 (FIGURE 4) which is in turn to the right of the lift cam 148. A fixed brake shoe 152 bears against the radially outer surface of said brake drum and is adjustable with respect thereto by means of a stud 153 and nut 154 whereby the drag on the brake drum 151 and therefore on the main shaft 86 can be adjusted. The stud 153 is threadedly fixed to an extension block 156 which is in turn fixed by any convenient means such as welding to the fixed plate 32.

A radially extending ejector arm 157 is secured by any convenient keyed means, such as by keying, to the rightward end of the main shaft 86 (FIGURE 2) and has pivotally connected to its radially outer end an extended push rod 159. The ejector arm 157 is so positioned on the main shaft 86 that said ejector arm will extend essentially rearwardly and be essentially parallel with the push rod 159 when the cam 148 is in its idle position shown in FIGURE 3. This alignment is described purely for purposes of illustration and should not be taken as limiting.

Turning now to FIGURE 6 which shows the ejector arm 157 in a position opposite to that of FIGURE 4, it will be seen that the remaining end of the push rod 159 is pivotally connected to an extended slide rod 161 which is constrained for essentially horizontal forward and rearward movement by means such as the guide 162 and 163 which are fixed to the under side of the framework 36. The leftward end of the slide rod 161 consists of an upstanding, essentially vertical section 166, which is preferably integral with the guide rod 161, the upper end of which is connected to an essentially horizontal, rearwardly (leftwardly as seen in FIGURE 6) extending member 167 which terminates at its rearward end in a vertically upstanding remover plate 168. The plane of said remover plate is essentially perpendicular in direction of motion of the slide rod 161 as well as to the direction of horizontal flow of the substacks through the apparatus. The top of the remover plate 168 is somewhat above the top of the table 14 when said table is in its lowermost position. It will be seen that rotation of the main shaft 86 and consequent rotation of the ejector arm 157 will, through the push rod 159, cause reciprocation of the slide rod 161 and of the remover plate 168 attached thereto. Said remover plate 168, when in its leftwardmost position as seen in broken lines in FIGURE 6, is slightly to the left of the table 14 and when in its rightwardmost position is preferably between the table 14 and an output conveyor generally indicated at 169. The output conveyor 169 may be of any convenient type but is here shown, for purposes of illustration only, as consisting of a pair of parallel, spaced chains 171 and 172 (FIGURES 1 and 2) so arranged as to move completed stacks forwardly and away from the table 14.

*Operation*

Turning now to the operation of the embodiment of the invention disclosed, it will be assumed, for purposes of illustration only, that it is desired to use the apparatus to make up stacks comprising four substacks and wherein the fourth or topmost substack has an extra battery plate placed on the top thereof. It will be recognized, however, that the embodiment of the invention here disclosed is capable of stacking a different number of substacks by placement of the tripper pin 28 in a different one of the tripper pin holes 27. It will be further recognized that the embodiment herein disclosed is capable of stacking substacks of different thicknesses than is shown in the drawings, such difference in thickness being preferably accommodated by replacing the tripper block 26 and rack 52 with similar members having hole and notch spacings, respectively, changed to be approximately equal to the changed thickness of the substacks. It may further be desirable to replace the crank cam 136 with a cam having a changed lift distance in cases where the change in substack height is relatively great. Although the apparatus embodying the invention and herein disclosed will accommodate small differences in substack thickness within a given stack it will be assumed for purposes of convenience in reference only that the substacks are of equal height save for the topmost one as hereinabove discussed.

It will be further assumed that some suitable device (not shown) of known type is employed to place substacks on the conveyor 4 (FIGURE 6) in a spaced relationship with one another so that the said substacks are engaged for forward movement by the lugs 6. The device employed may be conveniently, but is not limited to being, that of U.S. Patent No. 2,908,377. It will be further assumed that the conveyor 4 is driven in such manner that a substack will appear adjacent to table 14 in a regular periodic fashion wherein said period is that of one rotation of the clutch driver half 98. This result may easily be obtained in any of several ways, one way, for example, being the driving of the input conveyor 4, the fingers 2 and 3 and the clutch driver half 98 from the same source P by phase conserving means such as chains and sprockets.

The apparatus may be started by supplying the circuit including the clutch switch 74 and solenoid 131 with electrical current and then or simultaneously activating the substack producing means, the power source for the conveyor 4, the fingers 2 and 3 and the sprocket 91, and the circuitry for the plate switch 73 if same is to be used.

Assuming the table 14 to be at its uppermost or starting position, which in accord with the above assumption is the position shown in FIGURES 3 and 4, and assuming a substack 1 to appear on the conveyor 4 adjacent the table 14, said substack will be deposited by the conveyor 4 upon the table 14 as by means of the fingers 2 and 3.

At this point the clutch driver half 98 may be so positioned that the crank cam 136 is in its position shown in FIGURE 3. As the clutch driver half 98 is rotated by the driven sprocket 91 and the idler sprocket 92, and assuming rotation to be clockwise as seen in FIGURE 3, the crank cam 136 will engage the roller 143 on the crank 142 whereby the crank 142 is pivoted downwardly to rotate the crank shaft 141 in a clockwise direction whereby the arm 146 (FIGURE 4) is pivoted downwardly to move the pawl carrier 56 downwardly. Downward movement of the pawl carrier 56 (FIGURE 3) causes downward movement and counterclockwise rotation of the pawl 62, said counterclockwise rotation caused by the spring 63 and allowed by the lowered position of the pawl 62 with respect to the disengage pin 66. Such motion of the pawl 62 causes same to engage a notch on the rack 52 and continued downward movement of the pawl carrier 56 and pawl 62 causes said rack to move downwardly a distance preferably equal to the length of one notch on said rack. Such downward movement of the rack 52 causes a consequent equal downward displacement of the table 14 and the substack immediately hereinbefore deposited thereupon. Continued rotation of the clutch driver half 98 and crank cam 136 secured thereto allows the crank 142, crank shaft 141, arm 146 and pawl carrier 56 to be returned to their idle positions shown in FIGURES 3 and 4 by the lift spring 59. Continued rotation of the clutch driver half 98 to effect one complete revolution thereof returns the crank cam 136 to its starting position shown in FIGURE 3.

Between the time that the table 14 has taken its downward step as described hereinabove and the time when the crank cam 136 has completed one revolution as described hereinabove a second substack will be placed upon the table 14 by the fingers 2 and 3 in cooperation with the conveyor 4 (FIGURE 6). The clutch driver half 98 then goes through a second revolution during which the table 14 is stepped downwardly a second step.

During the aforementioned second downward movement of the table 14 and tripper block 26 attached thereto and with the hereinabove given assumptions and assuming the tripper pin 28 to be properly placed in accordance with such assumptions, the tripper pin 28 will contact the roller 78 whereby to actuate the switch 73. Actuation of the switch 73 causes, through any convenient means not shown, placement of an extra plate on the fourth substack which is now being or will soon be prepared. It will be noted that the plate switch 73 may be eliminated or disconnected from the substack producing means if it is not desired to have an extra plate or plates placed on substacks fed to the table 14.

Continued rotation of the clutch driver half 98 and crank cam 136 through the remainder of the third revolution and the whole of a fourth revolution steps the table 14 downwardly twice more and during which time said table receives more substacks for a total of four. Thus, after the crank cam 136 has gone through three complete revolutions the table 14 will occupy its fourth position which is three steps downward from its top or starting position and the fourth substack will be placed by the input conveyor 4 on the topmost of the three substacks already occupying the table 14 in the manner above described. As the crank cam 136 starts into its fourth revolution the table 14 will be dropped a fourth time to its fifth or, in this particular example of operation, its lowermost position in the manner above described.

While this fourth drop is taking place, the tripper pin 28 will strike the roller 83 to activate the clutch switch 74. Activation of the clutch switch 74 will take place while the crank cam 136 is bearing on the roller 143 of the crank 142 and more specifically will occur when the crank cam 136 is presenting an increasing radius ramp surface to the roller 143 of the crank 142. This occurs during the initial stage of engagement between said crank cam and said roller which coincides with the downward movement of the table 14. Since the crank cam 136, in this embodiment and for purposes of illustration only, operates upon the crank 142 during approximately ninety degrees of revolution it will be seen that activation of the clutch switch 74 takes place early in the fourth revolution and will occur before the first 90 degrees of said revolution have been completed.

Activation of the clutch switch 74 causes same to close to energize the solenoid 131 (FIGURE 3) and thereby forwardly extend the cam plate 119. Such extension allows the clutch driver half 98 to engage the clutch driven half 113, and therefore rotate the main shaft 86, after sufficient rotation of the clutch driver half 98 occurs whereby the roller 108 (FIGURE 5) engages the inset 117 in the clutch driven half 113. The point in the fourth revolution of the clutch driver half 98 at which said engagement occurs may be chosen as desired but will be here considered, for purposes of illustration only, to be at approximately 90 degrees of rotation. It will be noted, however, that such engagement should take place relatively quickly after the activation of the clutch switch 74 and should preferably take place at least during the first half of the fourth revolution of the clutch driver half 98.

Assuming said engagement to have taken place at the 90-degree point, the lift cam 148 and ejector arm 157 rotate with the now rotating main shaft 86. The ejector arm 157 passes from its de-energized or idle position shown in FIGURE 4 whereby the rod 159 is extended and the slide rod 161 and remover plate 168 attached thereto are moved forwardly or in a rightwardly direction as seen in FIGURE 6 whereby to remove the assembled stack of plates from the table 14 and onto the output conveyor 169. After rotation through 180 degrees, the ejector arm 157 will reach its extended position as shown in FIGURE 6 and the remover plate 168 will be in its forwardmost position.

At this point the retraction of the ejector arm 157 commences and after 360 degrees of rotation of the main shaft 86, the ejector arm 157 resumes its original or idle position and the remover plate 168 is returned to its rearwardmost position at the leftward end of the table 14 as shown in FIGURE 6.

In the meantime, upon engagement of the clutch driven half 113 and consequent rotation thereof, the lift cam 148 has commenced rotation from its neutral position shown in FIGURE 3 and has commenced bearing on the roller 51 at a point in time preferably soon after the ejector arm 157 commenced retraction of the remover plate 168. For purposes of illustration only, the lift cam 148 may so commence lifting at approximately 270 degrees rotation after the start of the fourth revolution of the clutch driver half 98, i.e., 180 degrees after start of main shaft 86 rotation. It will be noted that the upward travel of the table 14 is not impeded by the pawl 62 as said pawl is in its idle or disengaged position shown in FIGURE 3. As the table 14 and the tripper block 26 attached thereto begin travelling upwardly, the tripper pin 28 disengages the roller 83 and allows the clutch switch 74 to open whereby the solenoid 131 (FIGURE 3) is de-energized to allow the spring 133 to move the cam plate 119 rearwardly between the clutch halves 98 and 113 whereby, after sufficient rotation thereof, the clutch will be disengaged by the cam plate 119.

It will be noted that during the upward movement of said table the tripper pin 28 will again contact the roller 78 and actuate the switch 73. In the particular example of operation which is now being discussed, such actuation gives rise to a spurious or unwanted signal of relatively short duration. Any of several means may be used to prevent the addition of an extra plate to a substack due to the spurious signal. Such means are well known and need no further discussion here.

The lift cam 148 may be designed to lift during any desired period of revolution thereof but may be here considered, for purposes of illustration only, to provide lift through 90 degrees of rotation thereof. Thus, with the phasing of the elements so far assumed for illustrative purposes, the lift cam 148 will have lifted the table 14 to its topmost or starting position by the end of the fourth revolution of the clutch driver half 98 at which time a new substack will be deposited on the table 14, said substack being the first substack of a second stack.

With the commencement of the fifth revolution of the clutch driver half 98 a new cycle of operation begins and continues as above described in connection with the first stack. Assuming the above-mentioned phasing of elements, during the initial part of the fifth revolution, the clutch driver half 98 remains engaged with the clutch driven half 113 whereby the lift cam 148 is returned to its neutral position shown in FIGURE 3 and whereby the ejector arm 157 is returned to its neutral position shown in FIGURE 4 to return the remover plate 168 (FIGURE 6) to its idle position between the input conveyor 4 and the table 14. It is as these idle poistions are assumed, that the roller 108 is caused to disengage from the inset 117 by the now extended cam plate 119. In this example of operations the preceding assumptions and operation make apparent that said idle positions are assumed at the 90-degree point of the fifth revolution of the clutch driver half 98 which coincides with the 360-degree point in the revolution of the main shaft 86. The brake shoe 152 acts on the brake drum 151 to stop rotation of the main shaft 86 rapidly so that after repeated cycles the lift cam 148 and ejector arm 157 will assume the same neutral positions.

The apparatus may be stopped by cutting the power to the input conveyor 4 and to the clutch driver half 98.

While particular phasing relationships between the lift cam 148, crank cam 136, roller 108, inset 117, and the ejector arm 157 have been hereinabove stated for purpose of illustrating the operation of the apparatus embodying the invention it is fully contemplated that other phasing relationships between said elements may be employed and that the invention is not limited to the phasing relationships stated hereinabove.

Although a particular preferred embodiment of the invention has been disclosed above in detail for illustrative purposes, it will be understood that variations or modifications of such disclosure, which lies within the scope of the appended claims, are fully contemplated.

What is claimed is:

1. A platform holding and positioning device, adapted for moving the platform vertically with a change in the load of material thereon and for operating subsequent handling means in response to the vertical position of said platform, comprising the combination:

power means;

a frame structure;

an upstanding slide base on said frame structure;

a slide substantially vertically reciprocable on said slide base and means associated with said slide for supporting said platform;

means energizable by said power means for moving said platform downwardly as said material is placed thereon;

control means actuable in synchronism with said power means and trigger means actuable by said control means at a preselected position of said platform for energizing said subsequent handling means.

2. A device for stacking successive groups of at least one panel comprising in combination: supply means for delivering said groups;

a table for receiving said groups from said supply means and means supporting said table for substantially vertical movement with respect to said supply means;

further processing means operable upon a stack of said groups formed on said table for ejection of said stack from said table;

means operable in synchronism with said supply means for moving said table stepwise downwardly;

counting means actuable in synchronism with said supply means for actuating said further processing means after a first predetermined number of said stepwise downward movements of said table.

3. The device defined in claim 2 wherein said vertically aligned counting means comprises a vertically positioned plate fixed to said table supporting means and movable vertically with said table, said plate having a plurality of vertically spaced openings therethrough, and a horizontally projecting pin alternatively receivable in two of said openings and trigger means operable when said pin reaches a predetermined vertical position with respect to said supply means.

4. The device defined in claim 6 wherein said lift portion comprises a cam operable against a portion of said table-supporting means and means for connecting said cam to said clutch whereby when said clutch is energized said lift portion will rotate once and said cam will bear against the lower end of said table-supporting means for lifting same.

5. The device defined in claim 2 including trigger means actuatable by said counting means after a second predetermined number of steps for varying the composition of the panel groups before they are discharged from said supply means, said second number being less than said first number.

6. The device defined in claim 2 including table-lifting means operable for lifting said table comprising rotating drive means, a lift portion for lifting said table, clutch means and energizing means for energizing said clutch means, said clutch means being energizable at any point in the rotation of said drive means but effective for coupling said drive means with said lift portion at only a single rotational position of said drive means with respect to the lift means.

7. The device defined in claim 6 wherein said clutch includes a drive portion connected to said drive means, a driven portion connected to said lift portion and detent means for engaging said drive and driven portions at one relative rotative position thereof and said energizing means comprises a bar normally engaging said detent means for preventing connection of said drive and driven portions and a solenoid actuable in response to the assumption of a preselected vertical position by said counting means for moving said bar out of contact with said detent means whereupon further rotation of said drive means after actuation of said solenoid will allow said clutch means to effect coupling between said drive means and said lift portion for lifting said table.

8. In a machine for receiving groups of panels to form a stack thereof, the combination comprising:

a frame;

a table for receiving panel groups and means slideably supporting said table on said frame for up and down movement with respect thereto;

continuously energized means and means connecting same to said table for lowering said table in synchronism with said continuously energized means as groups of panels are placed on said table;

normally quiescent ejection means adjacent said table;

means synchronized with said continuously energized means for activating said ejection means to remove said groups of panels from said table.

9. A panel stacking machine comprising in combination:

continuously moving means;

frame means;

a table and means supporting said table for substantially vertical reciprocation with respect to said frame means;

input means energized in synchronism with said moving means for placing panels onto said table;

motion control means and means connecting same to said table for moving said table downwardly;

means connecting said motion control means to said continuously moving means for operating said motion control means in synchronism with said input means;

whereby said table is lowered in synchronism with the placement of panels thereon.

10. A panel machine comprising in combination:

frame means;

a table and means supporting said table for substantially vertical reciprocation with respect to said frame means;

input means for placing panels on said table;

first motion control means and means connecting same to said table for moving said table downwardly;

second motion control means and means connecting same to said table for retarding downward motion of said table;

means for operating one of said first and second motion control means in synchronism with said input means;

whereby said table is lowered in synchronism with the placement of panels thereon.

11. A panel stacking machine comprising in combination:

continuously rotating means;

frame means;

a table and means supporting said table for substantially vertical reciprocation with respect to said frame means;

input means energized in synchronism with said rotating means for vertically dropping panels onto said table;

first motion control means and means connecting same to said table for moving said table downwardly;

second motion control means and means connecting same to said table for retarding downward motion thereof;

means connecting one of said first and second motion control means to said continuously rotating means for operating said one means in synchronism with said input mean;

whereby said table is lowered in synchronism with the placement of panels thereon.

12. The device defined in claim 11 including:

ejection means supported on said frame means and energizable for movement with respect thereto for engaging panels on said table and removing same therefrom;

sequencing means driven in synchronism with said continuously rotating means for energizing said first motion control means to raise said table after a predetermined number of panels have been placed thereon and for energizing said ejection means after a predetermined number of panels have been placed thereon.

13. The device defined in claim 11 wherein said input means includes:
- a platform for supporting a group of panels over said table, said platform being retractable in synchronism with said continuously rotating means for allowing said panels to drop to said table; and
- stop means fixed to said frame structure for preventing retraction of said group with said platform.

14. A machine for stacking groups of at least one panel, comprising in combination:
- a frame;
- a table upon which groups of panels are stacked;
- means for supporting said table for up and down movement on said frame;
- sensing means actuable in response to movement of said table downwardly past a first position;
- clutch means having a continuously rotating drive portion and a driven portion, said portions being connectible upon occurrence of a preselected position of rotation of said drive portion with respect to said driven portion and means responsive to actuation of said sensing means for urging said connection of said portions;
- vertical rack means on said table supporting means and a pawl engageable therewith;
- a first cam on said drive portion and a crank and arm connecting said cam to said pawl for stepping said table downwardly in response to rotation of said drive portion;
- brake means for rapidly halting said driven portion upon disengagement thereof by said drive portion;
- a reciprocable stack ejector for removing a stack of panels from said table and crank means connecting said ejector to said driven portion;
- a second cam fixed to said driven portion and capable of engaging said table supporting means for moving said table upwardly, said second cam being arranged to lift said table after said stack is removed therefrom.

15. A machine for stacking groups of at least one panel comprising in combination:
- a frame;
- a table upon which groups of panels are stacked;
- means for supporting said table for up and down movement on said frame;
- a pair of horizontal fingers reciprocable over said table and means for depositing successive groups of panels thereon;
- stop means fixed with respect to said frame for maintaining each group over said table as said fingers withdraw to drop said group to said table;
- a first switch on said frame actuable in response to movement of said table downwardly past a first position;
- a second switch on said frame actuable in response to movement of said table downwardly past a second position spaced above said first position, said second switch being connected to said depositing means for varying the composition of at least one of the groups stacked on said table;
- adjustable actuating means on said table supporting means for actuating said first and second switches;
- clutch means having a continuously rotating drive portion drive in synchronism with said fingers and a driven portion, said portion being connectible upon occurrence of a preselected position of rotation of said drive portion with respect to said driven portion and means for connecting said portions responsive to actuation of said first switch;
- a vertical rack on said table supporting means and a pawl engageable therewith;
- a first cam on said driven portion and a crank and arm connecting said first cam to said pawl to step said table downwardly in response to rotation of said drive portion;
- frictional retarding means between said table supporting means and said frame for preventing downward movement of said table in the absence of a downward force thereon by said pawl;
- brake means for rapidly halting said driven portion upon disengagement thereof by said drive portion;
- a horizontally reciprocable stack ejector for removing a stack of panels from said table and crank means connecting said ejector to said driven half for reciprocation thereby;
- a second cam fixed to said driven portion for rotation therewith and capable of engaging said table supporting means for moving said table upwardly, said second cam being arranged to lift said table after said stack is removed therefrom.

References Cited by the Examiner

UNITED STATES PATENTS

| | | |
|---|---|---|
| 2,228,887 | 1/41 | Peterson. |
| 2,414,059 | 1/47 | Powers _____ 93—93.3 |
| 2,813,637 | 11/57 | Perry et al. _____ 93—93.3 X |
| 2,921,508 | 1/60 | Schneider et al. _____ 93—93 |

FRANK E. BAILEY, *Primary Examiner.*